United States Patent [19]
Kutz et al.

[11] Patent Number: 5,120,909
[45] Date of Patent: Jun. 9, 1992

[54] TERMINATING DEVICES DETECTION AND VERIFICATION CIRCUIT

[75] Inventors: David A. Kutz, Glendale, Ariz.; Tod R. Earhart, Ft. Collins, Colo.

[73] Assignee: AG Communication Systems Corporation, Phoenix, Ariz.

[21] Appl. No.: 692,404

[22] Filed: Apr. 26, 1991

[51] Int. Cl.$^5$ .............. H04L 25/02; H04B 3/46; H04B 3/02
[52] U.S. Cl. .................. 178/63 R; 178/63 A; 178/63 E; 178/69 N; 333/32
[58] Field of Search ............ 178/63 R, 63 A, 63 B, 178/63 C, 63 D, 63 E, 69 N; 375/36; 333/22 R, 22 F, 32

[56] References Cited
U.S. PATENT DOCUMENTS
4,437,075 3/1984 Darmouni ................ 333/32

Primary Examiner—Stafford D. Schrfyer
Attorney, Agent, or Firm—Anthony J. Baca

[57] ABSTRACT

A circuit for detecting and verifying a presence of a terminating device for a high speed data transmission line. The circuit contains a first cable detector which generates a first signal if a first cable is present. A second cable detector generates a second signal if a second cable is present. The terminating device is contained in a plurality of resistor packs, each of the which contains an extra resistor. A terminating device detector senses the extra resistor presence, thereby detecting the presence of the resistor packs. The terminating device detector generates an ALL-EQUIPPED signal and a NON-EQUIPPED signal, the ALL-EQUIPPED signal is generated when all of the plurality of resistor packs are present, the NON-EQUIPPED signal is generated when all of the plurality of resistor packs are absent. Finally, a verifier circuit receives the first signal, the second signal, the ALL-EQUIPPED signal and the NON-EQUIPPED signal. The verifier circuit verifies that if the ALL-EQUIPPED signal is present then only one of the first signal or the second signal is present, or, if the NON-EQUIPPED signal is present both the first signal and the second signal are present.

6 Claims, 5 Drawing Sheets

TERMINATING DEVICES DETECTION AND VERIFICATION CIRCUIT

FIELD OF THE INVENTION

The present invention relates in general to data communication systems, and more particularly, circuit for automatically detecting that the terminating devices on a data transmission line are properly configured.

BACKGROUND OF THE INVENTION

It is well known in the art of transmission that when a signal encounters a change in the characteristic impedance of a transmission line, a reflected signal is generated. This reflected signal sets up standing waves on the transmission line and depending on the relative location on the line the voltage can be substantially affected. As data transmission speeds increase, the presence of reflected waves can corrupt the integrity of a particular signal. In addition, the presence of standing waves cause a counter electromagnetic force (EMF) to be generated around the transmission line, thus "launching" a wave into free space. In other words, the transmission line becomes an antenna. The launching of a wave is not desirable for data transmission because electromagnetic interference (EMI) is increased and the amount of energy transferred to the receiver is decreased. Because of this and other reasons, it is the general practice in the art of digital transmission to insure that transmission lines are properly terminated thereby providing an uninterrupted characteristic impedance on the transmission line.

In the art of digital transmission, a transmission line may have several transmitters and receivers on the line. If each device (transmitter or receiver) contained a terminating device, the transmission line's impedance would not be properly matched. For this reason a transmission line must only be terminated on the ends, and not in the middle of a chain. In addition, parallel stubs extruding from the chain must not be of any appreciable length.

Prior to the present invention, the installer had to properly determine if physical disposition of the terminating resistors agreed with the theocratical needs.

It is therefore a primary objective to provide an automatic means of detecting the presence of the terminating resistors, and further, to determine if the detected configuration agrees with the expected configuration.

SUMMARY OF THE INVENTION

In order to accomplish the object of the present invention there is provided a circuit for detecting and verifying a presence of a terminating device. The circuit contains a first cable detector which generates a first signal if a first cable is present. A second cable detector generates a second signal if a second cable is present.

The terminating device is contained in a plurality of resistor packs, each of the which contains an extra resistor. A terminating device detector senses the extra resistor presence, thereby detecting the presence of the resistor packs. The terminating device detector generates an ALL-EQUIPPED signal and a NON-EQUIPPED signal, the ALL-EQUIPPED signal is generated when all of the plurality of resistor packs are present, the NON-EQUIPPED signal is generated when all of the plurality of resistor packs are absent.

Finally, a verifier circuit receives the first signal, the second signal, the ALL-EQUIPPED signal and the NON-EQUIPPED signal. The verifier circuit verifies that if the ALL-EQUIPPED signal is present then only one of the first signal or the second signal is present, or, if the NON-EQUIPPED signal is present both the first signal and the second signal are present.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

Figure 1:
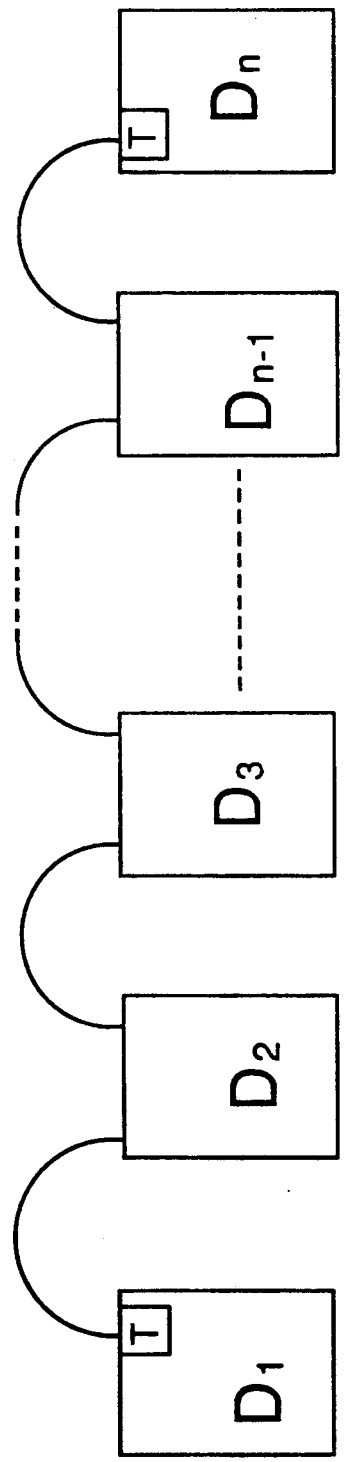
FIG. 1 shows a plurality of units connected in a daisy-chain configuration.

Referring first to FIG. 1, a typical daisy-chained configuration is shown. As FIG. 1 shows, $D_l$ and $D_n$ have terminating devices in place, $D_2$ through $D_{n-1}$ do not. With this configuration, assuming the terminating devices match the transmission line properly, there are no changes in the characteristic impedance of the transmission line, thereby reducing standing waves on the transmission line.

To properly determine if the actual configuration meets the predicted configuration, two facts must be determined. First, should the termination devices be present. Second, are the termination devices present. The first fact depends on the position in the daisy-chain.

Figure 2:
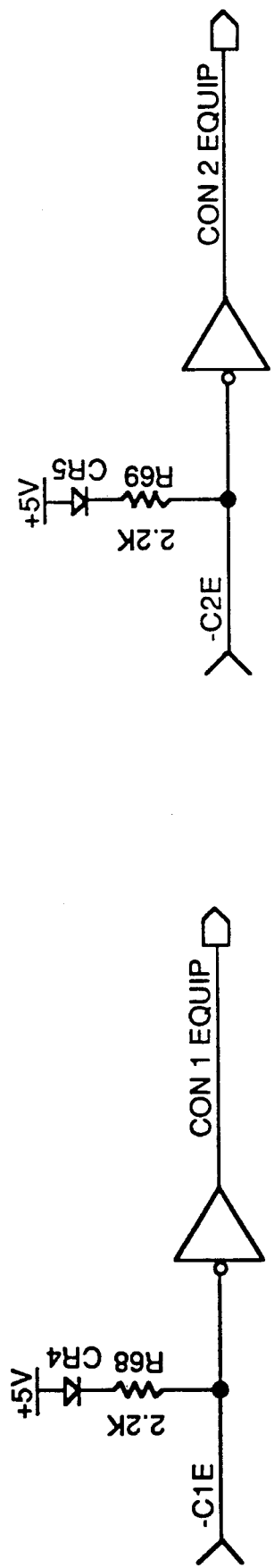
FIG. 2 is a schematic diagram of the present invention showing the cable sense points.

In the present invention, each device on the daisy-chain has two connection ports. If a device is on the end of the daisy-chain then only one port is occupied. However, if the device is in the middle of the daisy-chain, both ports are occupied. The circuit in FIG. 2 is used to detect the presence of each cable. If only one cable is present (i.e. the device is on the end of the daisy-chain) then either CON_1_EQUIP or CON_2_EQUIP will be a logic high, but not both. If both cables are present (i.e. the device is in the middle of the daisychain) then both CON_1_EQUIP or CON_2_EQUIP will be a logic high. To facilitate multiple connections and detections, the connecting wire may need to be twisted or jumpered such that each cable sense pin senses a ground in the far end port.

Figure 3:
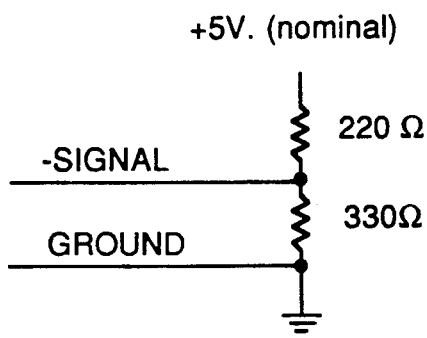
FIG. 3 shows the recommended termination for single-ended devices.
Figure 4:
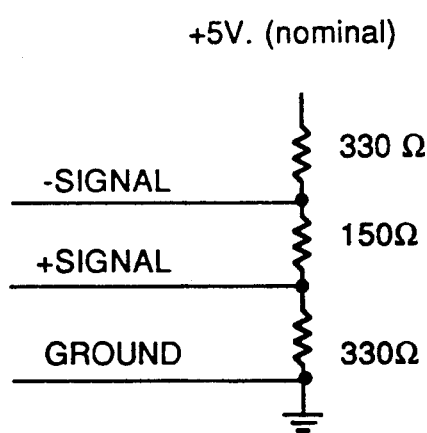
FIG. 4 shows the recommended termination for differential devices.
Figure 5:
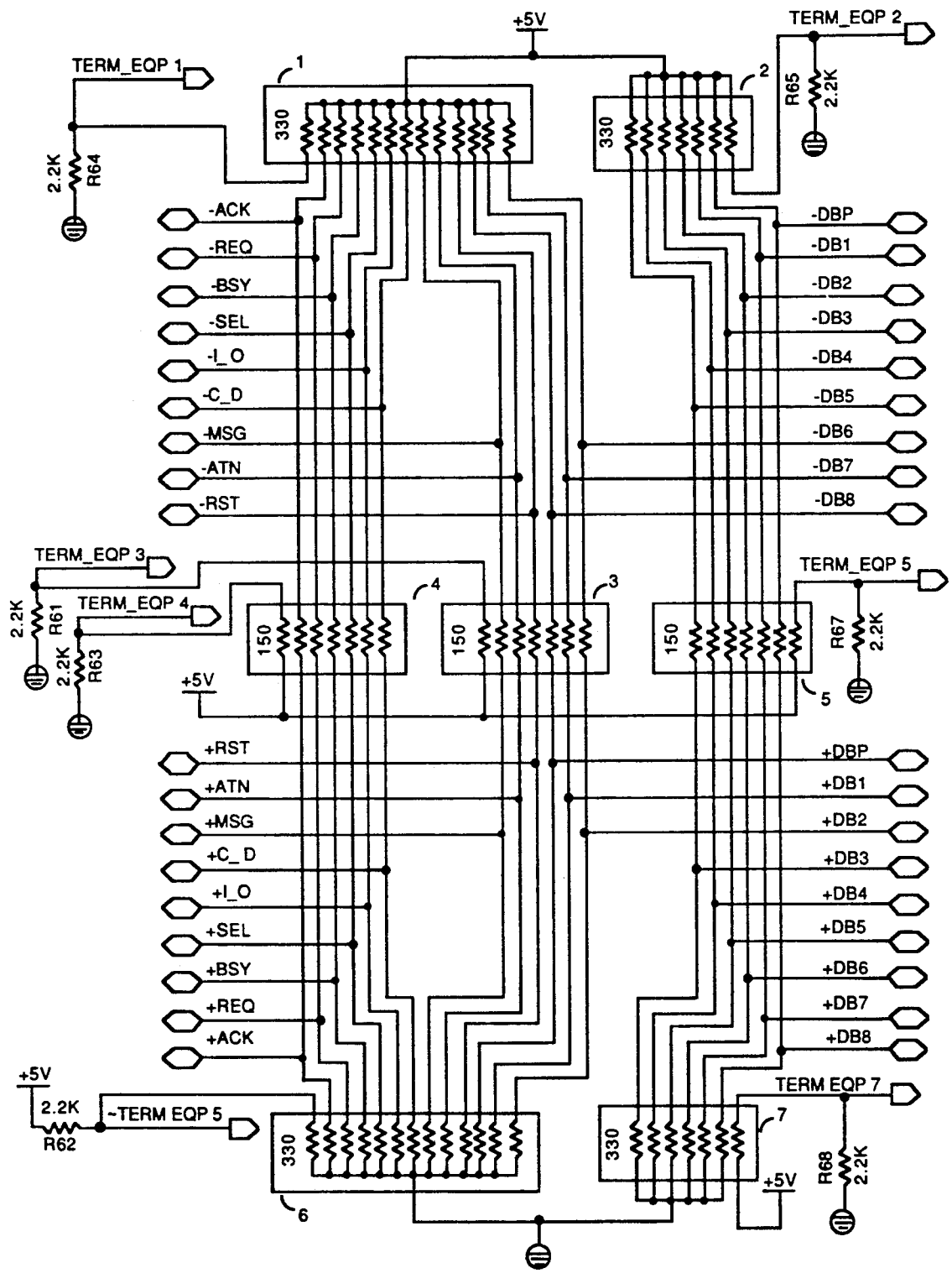
FIG. 5 is a schematic diagram of the present invention using the termination scheme of FIG. 4.

Referring to FIGS. 3 and 4, where the recommended termination circuits for a single-ended and differential devices are shown respectively. Both configuration properly create a 132 ohm load for the termination of signal as required for the Small Computer Interface (SCSI). The present invention, as shown in FIG. 5, implements the load scheme of FIG. 4. It will be appreciated to one skilled in the art that the present invention is not limited to this type of interface.

The signal names (e.g. -ACK) are used as described in American National Standard for Information Systems—Small Computer System Interface (SCSI) X3.131-1986. An exact meaning and function of the individual signals is not needed to understand the present invention. Looking closely at FIG. 5, an extra resistor in each package can be seen. For example RESISTOR PACK 1 contains an extra resistor. The extra resistor is connected to RESISTOR R64 such that only when RESISTOR PACK 1 is present is the signal TERM_EQP_1 a logic one. The extra resistor of RESISTOR PACKS 2 through 7 are used to control signals thereby indicating the presence or absence of the respective resistor pack. The seven signals from the individual resistor packs are used by the circuit in FIG. 6 to generate two signals; ALL_TERM_EQP and NO_TERM_EQP. If and only if all seven resistor packs are equipped is the ALL_TERM_EQP signal a logic high. If and only if all seven resistor packs are absent is the NO_TERM_EQP signal a logic high. If some, but not all, of the seven resistor packs are installed then both ALL_TERM_EQP and NO_TERM_EQP will be a logic low.

Figure 6:
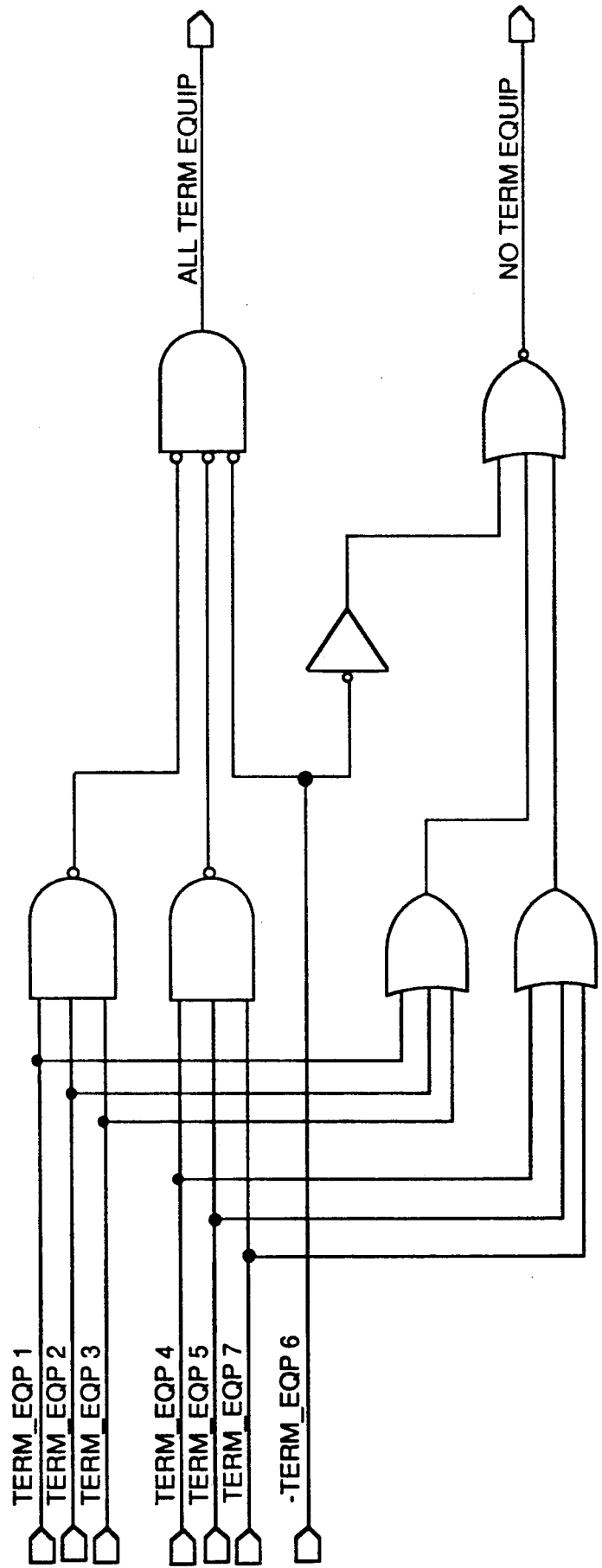
FIG. 6 is a schematic diagram of the present invention showing the termination sense points.

The circuits of FIG. 2 and 6 can then be logically tested to determine if the configuration is correct. If only one of CON_1_EQUIP or CON_2_EQUIP is a logic high, then ALL_TERM_EQP must also be a logic high. If both CON_1_EQUIP or CON_2_EQUIP are a logic high, then NO_TERM_EQP must also be a logic high. Any other signal combination would be an error state and an appropriate indication should be enabled.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A circuit for detecting and verifying a presence of a terminating device, said circuit comprising:
    a first cable detector means for generating a first signal if a first cable is present;
    a second cable detector means for generating a second signal if a second cable is present;
    a terminating device detector means for generating a third signal if said terminating device is present; and
    a verifier means arranged to receive said first signal, said second signal and said third signal, said verifier means verifies that if said third signal is present then only one of said first signal or said second signal is present, said verifier means verifies that if said third signal is absent both said first signal and said second signal are present.

2. A circuit for detecting and verifying a presence of a terminating device as claimed in 1, said terminating device comprises a resistor network.

3. A circuit for detecting and verifying a presence of a terminating device as claimed in 2, wherein:
    said resistor network is contained in a plurality of resistor packs;
    each of said plurality of resistor packs contains an extra resistor; and
    said terminating device detector means senses said extra resistor presence, thereby detecting said presence of said terminating device.

4. A circuit for detecting and verifying a presence of a terminating device as claimed in 3, wherein said terminating device detector means generating an ALL-EQUIPPED signal and a NON-EQUIPPED signal, said ALL-EQUIPPED signal is generated when all of said plurality of resistor packs are present, said NON-EQUIPPED signal is generated when all of said plurality of resistor packs are absent.

5. A circuit for detecting and verifying a presence of a terminating device, said circuit comprising:
    a first cable detector means for generating a first signal if a first cable is present;
    a second cable detector means for generating a second signal if a second cable is present;
    said terminating device is contained in a plurality of resistor packs;
    each of said plurality of resistor packs contains an extra resistor;
    a terminating device detector means for generating a third signal if said terminating device is present, said terminating device detector means senses said extra resistor presence, thereby detecting said presence of said terminating device; and
    a verifier means arranged to receive said first signal, said second signal and said third signal, said verifier means verifies that if said third signal is present then only one of said first signal or said second signal is present, said verifier means verifies that if said third signal is absent both said first signal and said second signal are present.

6. A circuit for detecting and verifying a presence of a terminating device, said circuit comprising:
    a first cable detector means for generating a first signal if a first cable is present;
    a second cable detector means for generating a second signal if a second cable is present;
    said terminating device is contained in a plurality of resistor packs;
    each of said plurality of resistor packs contains an extra resistor;
    a terminating device detector means for generating an ALL-EQUIPPED signal and a NON-EQUIPPED signal, said ALL-EQUIPPED signal is generated when all of said plurality of resistor packs are present, said NON-EQUIPPED signal is generated when all of said plurality of resistor packs are absent; and
    a verifier means arranged to receive said first signal, said second signal, said ALL-EQUIPPED signal and said NON-EQUIPPED signal, said verifier means verifies that if said ALL-EQUIPPED signal is present then only one of said first signal or said second signal is present, said verifier means verifies that if said NON-EQUIPPED signal is present both said first signal and said second signal are present.

* * * * *